US008819213B2

(12) United States Patent
Frattura et al.

(10) Patent No.: US 8,819,213 B2
(45) Date of Patent: Aug. 26, 2014

(54) SYSTEM, METHOD AND APPARATUS FOR TRAFFIC MIRROR SETUP, SERVICE AND SECURITY IN COMMUNICATION NETWORKS

(75) Inventors: David E. Frattura, New York, NY (US); Richard W. Graham, Derry, NH (US); John Roese, Newmarket, NH (US)

(73) Assignee: Extreme Networks, Inc., San Jose, CA (US)

( * ) Notice: Subject to any disclaimer, the term of this patent is extended or adjusted under 35 U.S.C. 154(b) by 1174 days.

(21) Appl. No.: 11/208,372

(22) Filed: Aug. 19, 2005

(65) Prior Publication Data

US 2006/0059163 A1  Mar. 16, 2006

Related U.S. Application Data

(60) Provisional application No. 60/603,222, filed on Aug. 20, 2004.

(51) Int. Cl.
*G06F 15/173* (2006.01)
*H04L 12/26* (2006.01)
*H04L 29/06* (2006.01)
*H04L 29/08* (2006.01)

(52) U.S. Cl.
CPC ............ *H04L 12/2602* (2013.01); *H04L 43/00* (2013.01); *H04L 63/30* (2013.01); *H04L 67/1095* (2013.01); *H04L 63/14* (2013.01); *H04L 43/16* (2013.01)
USPC ........... 709/224; 709/223; 709/225; 709/226; 726/2; 726/3

(58) Field of Classification Search
CPC ..... H04L 12/2602; H04L 43/00; H04L 63/30; H04L 63/14; H04L 67/1095; H04L 43/16
USPC .................... 709/223–228; 707/10, 633–635; 370/229, 232, 235; 726/2, 3
See application file for complete search history.

(56) References Cited

U.S. PATENT DOCUMENTS 4,897,842 A  1/1990  Gang, Jr.
4,939,509 A  7/1990  Bartholomew et al.
(Continued)

FOREIGN PATENT DOCUMENTS

EP  0453128  10/1991
EP  0462691  12/1991
(Continued)

OTHER PUBLICATIONS

International Search Report issued by the World Intellectual Property Organization in International Patent Application No. PCT/US2005/029737 dated Jun. 7, 2007.

(Continued)

*Primary Examiner* — Saleh Najjar
*Assistant Examiner* — Peiliang Pan
(74) *Attorney, Agent, or Firm* — McCarter & English, LLP

(57) ABSTRACT

The present invention provides method and systems for dynamically mirroring network traffic. The mirroring of network traffic may comprise data that may be considered of particular interest. The network traffic may be mirrored by a mirror service portal from a mirror sender, referred to as a mirror source, to a mirror receiver, referred to as a mirror destination, locally or remotely over various network segments, such as private and public networks and the Internet. The network traffic may be mirrored to locations not involved in the network communications being mirrored. The present invention provides various techniques for dynamically mirroring data contained in the network traffic from a mirror source to a mirror destination.

31 Claims, 9 Drawing Sheets

(56) References Cited

U.S. PATENT DOCUMENTS

| | | | |
|---|---|---|---|
| 5,115,495 A | 5/1992 | Tsuchiya et al. | |
| 5,151,897 A | 9/1992 | Suzuki | |
| 5,195,087 A | 3/1993 | Bennett et al. | |
| 5,274,631 A | 12/1993 | Bhardwaj | |
| 5,299,257 A | 3/1994 | Fuller et al. | |
| 5,305,312 A | 4/1994 | Fornek et al. | |
| 5,315,580 A | 5/1994 | Phaal | |
| 5,357,508 A | 10/1994 | Le Boudec et al. | |
| 5,485,455 A | 1/1996 | Dobbins et al. | |
| 5,495,607 A | 2/1996 | Pisello et al. | |
| 5,509,123 A | 4/1996 | Dobbins et al. | |
| 5,515,376 A | 5/1996 | Murthy et al. | |
| 5,574,906 A | 11/1996 | Morris | |
| 5,627,819 A | 5/1997 | Dev et al. | |
| 5,659,614 A | 8/1997 | Bailey, III | |
| 5,802,320 A | 9/1998 | Baehr et al. | |
| 6,003,030 A * | 12/1999 | Kenner et al. | 707/10 |
| 6,012,095 A | 1/2000 | Thompson et al. | |
| 6,041,042 A * | 3/2000 | Bussiere | 370/245 |
| 6,385,170 B1 | 5/2002 | Chiu et al. | |
| 6,484,204 B1 * | 11/2002 | Rabinovich | 709/226 |
| 6,507,854 B1 * | 1/2003 | Dunsmoir et al. | 715/201 |
| 6,618,818 B1 | 9/2003 | Wahl et al. | |
| 6,707,817 B1 | 3/2004 | Kadambi et al. | |
| 6,856,991 B1 | 2/2005 | Srivastava | |
| 6,870,817 B2 * | 3/2005 | Dolinar et al. | 370/252 |
| 6,970,475 B1 | 11/2005 | Fraser et al. | |
| 7,031,304 B1 | 4/2006 | Arberg et al. | |
| 7,240,219 B2 | 7/2007 | Teicher et al. | |
| 7,269,743 B2 | 9/2007 | Yagawa | |
| 7,690,040 B2 | 3/2010 | Frattura et al. | |
| 7,752,457 B2 | 7/2010 | Yagawa | |
| 2001/0055274 A1 | 12/2001 | Hegge et al. | |
| 2002/0027906 A1 | 3/2002 | Athreya et al. | |
| 2002/0069278 A1 | 6/2002 | Forslow | |
| 2002/0075809 A1 | 6/2002 | Phaal | |
| 2002/0078384 A1 | 6/2002 | Hippelainen | |
| 2003/0051045 A1 | 3/2003 | Connor | |
| 2004/0003094 A1 * | 1/2004 | See | 709/227 |
| 2004/0006702 A1 | 1/2004 | Johnson | |
| 2004/0008621 A1 | 1/2004 | Yaker | |
| 2004/0213232 A1 | 10/2004 | Regan | |
| 2004/0233904 A1 | 11/2004 | Saint-Hilaire et al. | |
| 2005/0060700 A1 * | 3/2005 | Bucher et al. | 717/176 |
| 2005/0114522 A1 | 5/2005 | Lavigne et al. | |
| 2005/0220092 A1 | 10/2005 | Lavigne et al. | |
| 2006/0037075 A1 * | 2/2006 | Frattura et al. | 726/22 |
| 2008/0016373 A1 | 1/2008 | Yagawa | |
| 2010/0268933 A1 | 10/2010 | Frattura et al. | |

FOREIGN PATENT DOCUMENTS

| | | | |
|---|---|---|---|
| EP | 1465368 | 10/2004 | |
| WO | WO 95/34158 | 12/1995 | |
| WO | WO 98/49626 * | 5/1998 | G06F 13/00 |
| WO | WO 98/49626 | 11/1998 | |
| WO | WO 03/047205 | 6/2003 | |

OTHER PUBLICATIONS

International Preliminary Report on Patentability and Written Opinion issued by the International Searching Authority in International Patent Application No. PCT/US2005/029737 dated Jul. 3, 2007 and Jun. 7, 2007, respectively.

International Search Report issued by the World Intellectual Property Organization in International Patent Application No. PCT/US2005/007927 dated Aug. 8, 2005.

Sweeney et al., "Comments of Latanya Sweeney, Ph.D., Director, Laboratory for International Data Privacy, Assistant Professor of Computer Science and Public Policy, Carnegie Mellon University, to the Department of Health and Human Sciences on Standards of Privacy of Individually Identifiable Health Information," retrieved from http://privacy.cs.cmu.edu/dataprivacy/HIPAA/HIPAAcomments.pdf, dated Apr. 26, 2002.

Hardaker et al., "Justification and Requirements for a National DDoS Defense Technology Evaluation Facility," retrieved from http://www.isi.edu/deter/docs/02-052DDoS_Defense_Evaluation_Facility.pdf, dated Jul. 26, 2002.

* cited by examiner

SYSTEM, METHOD AND APPARATUS FOR TRAFFIC MIRROR SETUP, SERVICE AND SECURITY IN COMMUNICATION NETWORKS

RELATED APPLICATIONS

This present application claims priority to U.S. Provisional Patent Application No. 60/603,222, entitled "System, method, and apparatus for traffic mirror setup, service and security in communication networks", filed Aug. 20, 2004, which is incorporated herein by reference.

TECHNICAL FIELD

The present invention generally relates to systems and methods of dynamically mirroring network traffic.

BACKGROUND INFORMATION

The mirroring of network traffic is a common feature found in many network relay devices, such as network switches. Network traffic mirroring, or port mirroring, is a method of monitoring network traffic that forwards a copy of incoming and outgoing traffic from one port of a network device, such as a switch, to another port of the network device from which the mirrored network traffic may be studied. Network traffic mirroring provides a service that duplicates network traffic as it passes through a device to another port, or remote system, and may duplicates all or a portion of the network traffic. Network traffic mirroring may be used for network troubleshooting, network security and performance monitoring, and security audits. A network administrator may use mirroring as a diagnostic tool or debugging feature, such as a tool for investigating network intrusions or network attacks. Network mirroring may be performed and managed locally or remotely.

Current techniques for mirroring data are limited in that they static. The traffic mirroring has to be manually established and configured. In a system where multiple flows of traffic are to be monitored, multiple traffic mirroring must be set-up and configured. Each instance of traffic mirroring requires bandwidth and as the number of traffic mirrors increases the load on the network increases. This is inefficient because in some instances a network operator may only want to have certain traffic mirrored or to mirror traffic only if certain criterion is met. For example, in performing a wire tap of a Voice over IP network (VoIP) communication, law enforcement organizations may only be interested in communications between certain end users. Likewise a network operator may only wish to mirror traffic if bandwidth of a network communication increases above a certain amount.

Therefore what is need is a method and system for dynamically mirroring traffic that does not need to be manually established and configured. In this manner additional traffic mirrors can be established as needed to mirror specific traffic or in response to certain criteria.

SUMMARY OF THE INVENTION

The present invention provides method and systems for dynamically mirroring network traffic. The mirroring of network traffic may comprise data that may be considered of particular interest. The network traffic may be mirrored by a mirror service portal from a mirror sender, referred to as a mirror source, to a mirror receiver, referred to as a mirror destination, locally or remotely over various network segments, such as private and public networks and the Internet. The network traffic may be mirrored to locations not involved in the network communications being mirrored. The present invention provides various techniques for dynamically mirroring data contained in the network traffic from a mirror source to a mirror destination.

In accordance with a first embodiment a method for dynamically mirroring network traffic is provided. The method comprises monitoring an operation characteristic of a network for a criterion; and dynamically initiating traffic mirroring upon detection of a criterion in the monitored operational characteristic. The traffic mirroring may be initiated in response to a policy or trigger based upon the detected criterion. Criteria may include events or aspects of the network traffic. The dynamic initiation of traffic mirroring may further involve establishing a mirror service portal. The establishing of a network portal usually includes establishing a mirror source for mirroring traffic, establishing a mirror destination for receiving mirrored traffic, and communicating, by the mirror source, the mirrored traffic to the mirror destination.

In accordance with another embodiment, a medium for use with an electronic device is provided. The medium holds instructions executable by the electronic device for performing a method. The method comprises monitoring an operation characteristic for a criterion; and dynamically initiating traffic mirroring upon detection of a criterion in the monitored operational characteristic.

In accordance with another aspect, a system is provided for dynamically mirroring network traffic. The system comprises a mirror source and a mirror destination. The mirror source provides mirrored traffic. The mirror destination receives the mirrored traffic from the source. In this system, a mirror service portal between the source and the destination is established upon a criteria being met.

In accordance with another aspect, a network device for dynamically mirroring network traffic is provided. The device comprises a traffic monitor, a mirror source, and a network interface. The traffic monitor monitors network traffic. Upon a criterion being met, the mirror source receives a unit of network traffic mirrors the unit of data to a destination point. The network interface allows for the communication of the traffic unit to the mirror destination.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1A:
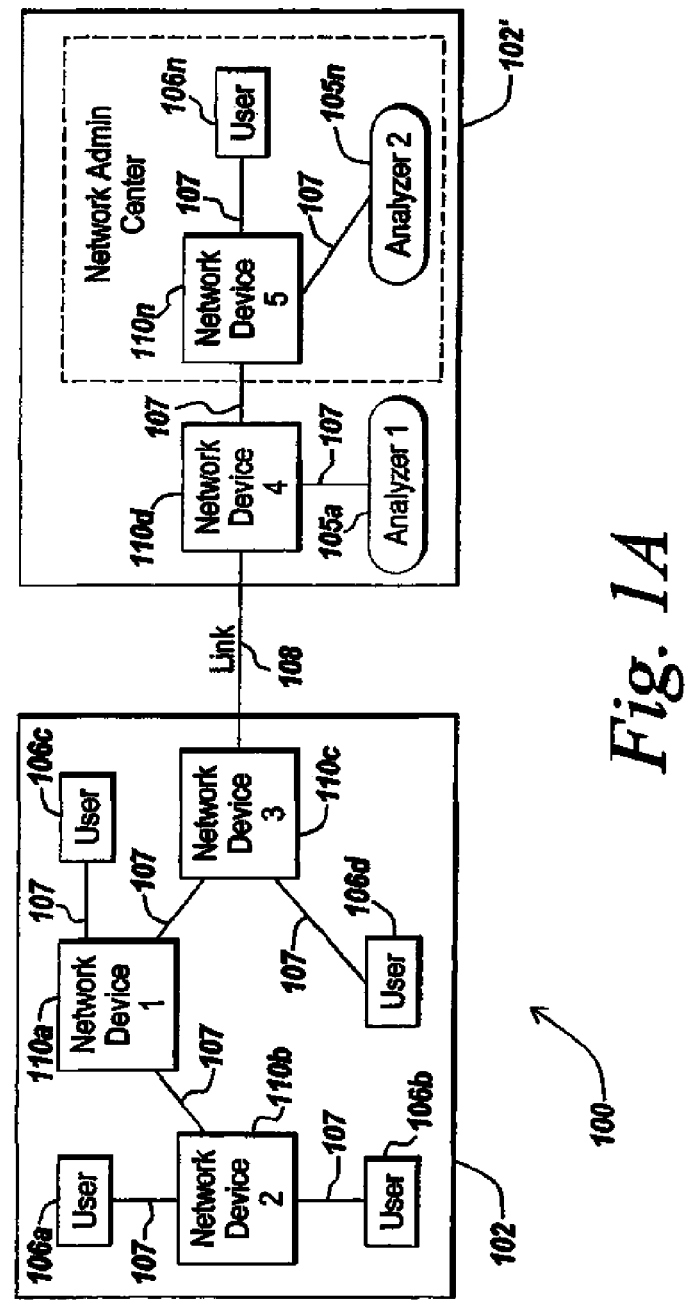
FIG. 1A is a block diagram of an illustrative network environment for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for dynamically mirroring network traffic. Network traffic may be mirrored from a mirror sender, referred to as a mirror source, to a mirror receiver, referred to as a mirror destination, by duplicating or copying all or a portion of frames of network traffic. The network traffic may be mirrored locally on a local area network (LAN) from one network relay device to another network relay device, or from a network relay device directly to a network mirror receiving device, such as a network analyzer. The network traffic may be mirrored remotely over various network relay and other network devices, network segments, transmissions mediums and other network systems and networks, such as any private/public network and the Internet.

The mirrored network traffic may comprise data that may be considered of significance or of particular interest. For example, the data payload of a frame of mirrored network traffic may include malicious, unauthorized, unauthenticated, or otherwise suspect data. In another example, the data payload of a frame of mirrored network traffic may include a Voice over IP (VoIP) communications between users under investigation by law enforcement. The network traffic may be mirrored to a mirror destination not involved in the original network traffic being mirrored. For example, network traffic of email and/or VoIP between a first user and a second user on a first network segment of a corporate LAN may be mirrored to another corporate network segment in the same or different facility. In another example, the network traffic between the first and second user may be remotely mirrored through various network segments and networks over the Internet to a remote facility and mirror receiving device, such as an analyzer.

In a tunneling technique of the illustrative embodiment of the present invention, the mirrored network traffic is encapsulated using a tunneling protocol communicated from the mirror source to the mirror destination. The tunneling protocol may include any tunneling type protocol, such as secure tunneling protocol, and other higher level protocols such as Secure Socket Layer (SSL) tunnels. Alternatively, a Medium Access Control (MAC) layer tunneling method may be used to encapsulate a MAC layer frame within another MAC header. The tunneling technique keeps the data of mirrored traffic private, even when it travels over intermediary nodes that may also perform additional mirroring. For example, an intermediate network relay device between the mirror source and mirror destination may provide a second mirror. Since this technique of the present invention provides encapsulated mirrored network traffic, the second mirroring device would mirror the encapsulated network traffic. As such, the data of the frames of the first mirrored network traffic would remain private through one or more subsequent network traffic mirroring.

Additionally, the illustrative embodiment of the present invention provides for a network tap device that incorporates any of the techniques of the present invention. The network tap device may include one or more ports for receiving mirrored network traffic from a mirror source or for otherwise acting as a mirror source. Also, the network tap device may include a network attachment interface for communicating mirrored network traffic to a mirror destination. The network tap device may be connectable to a mirroring port of a network relay device or to a tap device that intercepts and forwards network traffic. The illustrative network tap device of the present invention includes suitable means and/or mechanisms for performing any of the techniques discussed herein on mirrored network traffic.

FIG. 1A depicts an example network environment suitable for practicing an illustrative embodiment of the present invention. In brief overview, the network environment 100 includes a first network system 102 and a second network system 102' interconnected through an inter-network link 108. For example, network system 102 may represent a network infrastructure, or a portion thereof, of a facility, building, or floor of a corporate enterprise. The network system 102' may represent another network infrastructure of another facility, building, floor of the corporate enterprise, or of a third party, such as a vendor or customer of the corporate enterprise. The network system 102 may include one or more network devices, such as network devices 110a, 110b, and 110c, and the network system 102' may also include one or more network devices, such as network devices 110d-110n. The network device 110a-110n may comprise a router, switch, hub, access point, special or general purposes computing device, or any other electronic device for sending, receiving, relaying, terminating, forwarding, and/or otherwise processing network communications by any type of transmission medium at any or one or more of the network protocol layers. The network device 110a-110n may comprise any other type and/or form of computing or telecommunications device that is capable of communication and that has sufficient processor power and memory capacity to perform the operations described herein. Furthermore, the network device 110a-110n may be implemented by any suitable means and/or mechanism in software, hardware, or any combination thereof.

The network systems 102, 102' may include users of the network systems 102, 102', such as users 106a-106n. A user 106a-106n may include a human user or computing device, such as a client or server computer, or a combination of a human user and one or more computing devices of any type and/or form. Any of the users 106a-106n may be connected to a network device 110a-110n via any type of communication interface and/or link 107. In turn, any of the network device 110a-110n may be connected to other network devices 110a-110n via any type of communication interface and/or link 107, 108. Additionally, the network devices 110a-110n may interface to a Local Area Network (LAN), Metropolitan Area Network (MAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above.

The users 106a-106n can connect to the network devices 110a-110n through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, TCP/IPv6, GPRS, IPX, SPX, Ethernet, IEEE 802.17 RPR, Passive Optical Networks, DOCSIS Digital Subscriber Line (DSL), RS232, IEEE 802.11, IEEE 802.11a, IEEE 802.11b, IEEE 802.11g, and direct asynchronous connections).

The links 107, 108 between any user 106a-106n, network device 110a-110n, and/or network system 102, 102' may include any type and/or form of transmission medium, such as electrical wiring or cabling, fiber optics, electromagnetic radiation or via any other type and/or form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a network device 110a-110n to practice the operations of the present invention as described herein.

Although FIG. 1A generally describes an illustrative network environment 100, one ordinarily skilled in the art will recognize and appreciate the various types and/or forms of network devices, network entry devices, network systems, network topologies, network infrastructures, transmission mediums, communication links, communication protocols, users, and/or computing devices that may used in a networking environment 100 in practicing the operations of the present invention as described herein. Additionally, one ordinarily skilled in the art will recognize and appreciate that any of the network systems 102, 102' may comprise any type and/or form of network segments, sub-networks, and one or more portions of the network environment 100 may communicate via the Internet. Furthermore, although FIG. 1A is shown with multiple network systems 102 and 102', one ordinarily skilled in the art will recognize and appreciate the network environment 100 may comprise a single network system 102 or any number of network systems 102, 102'.

The network environment 100 of FIG. 1A may be used for network traffic mirroring, remotely or locally, from any network device 110a-110n to any other network device 110a-110n configured to perform network traffic mirroring. Additionally, any network device 110a-110n may be connected to and in communication with one or more analyzers 105a-105n, such as analyzer 105a connected to network device 110c and analyzer 2 105n connected to network device 110n. The analyzer 105a-105n may comprise any type of network device 110a-110n, or may be any other type and/or form of electronic device that may be used for reviewing, analyzing, sniffing, trouble-shooting, inspecting, intercepting, filtering, debugging, monitoring, or otherwise processing any portion of mirrored network traffic. One ordinarily skilled in the art will recognize and appreciate the various types and/or form of analyzers 105a-105n that may be used in practicing the operations of the present invention as described herein.

In accordance with the operations of the present invention described herein, any of the network devices 110a-110n, analyzers 105a-105n, and/or communication links 107, 108 may comprise communicating any network traffic using any of the dynamic mirroring techniques of the present invention. Additionally, any of the network devices 110a-110n and/or analyzers 105a-105n may perform, incorporate, or otherwise use any of the techniques of the present invention, or may comprise a network tap device in another embodiment of the present invention.

Figure 1B:
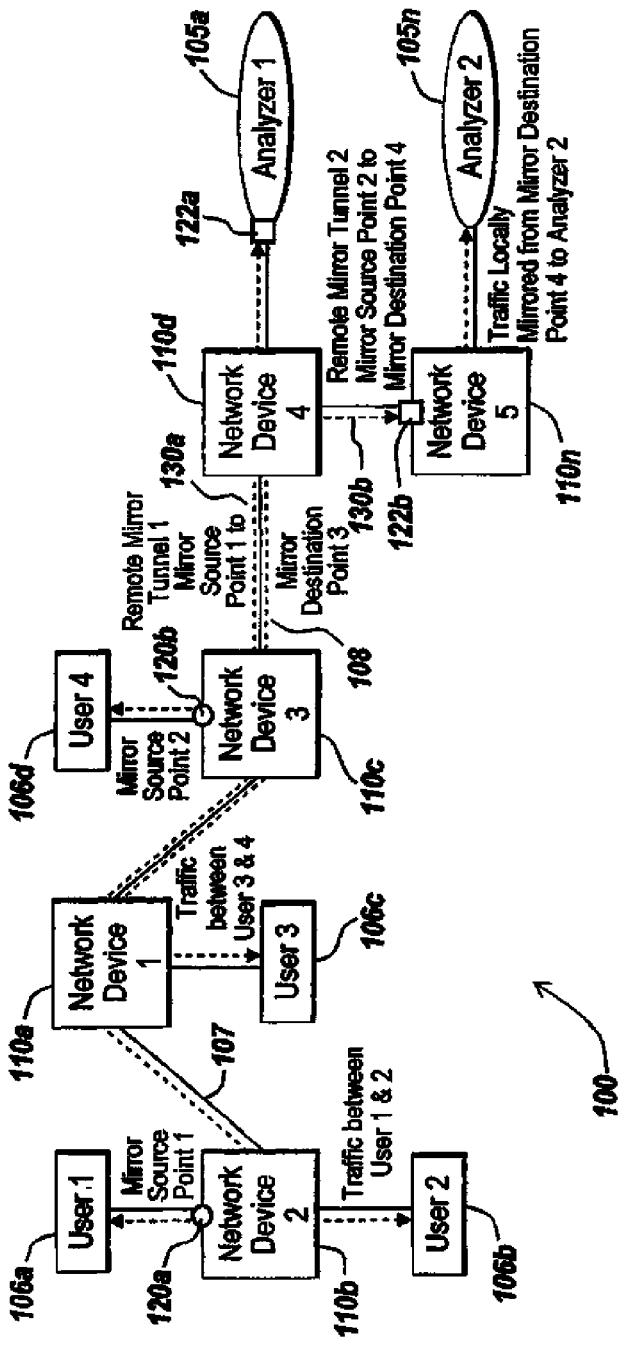
FIG. 1B is a block diagram of an illustrative embodiment of network devices practicing an illustrative embodiment of the present invention.

FIG. 1B depicts another illustrative embodiment of the network environment 100 of FIG. 1A for dynamically mirroring network traffic and practicing the operations of the present invention as described herein. In the network environment 100 of FIG. 1B traffic between user 106a, i.e., user 1, and user 106b, i.e., user 2 is dynamically mirrored via the network device 110b. Additionally, network traffic between user 106c, i.e., user 3, and user 106d, i.e., user 4 is dynamically mirrored via network devices 110a and 110c.

For network traffic mirroring between user 1 and user 2, the network traffic mirroring may be performed remotely via a mirror service portal between mirror source 120a of network device 110b and mirror destination 122a of analyzer 105a. For network traffic mirroring between user 3 and user 4, the network traffic mirroring may be performed remotely via a mirror service portal between mirror source 120b of network device 120b and mirror destination 122b of network device 110n. Additionally, the network device 110n is configured to mirror local traffic to analyzer 105n.

Although FIG. 1B depicts these illustrative network traffic mirroring configurations, one ordinarily skilled in the art will recognize and appreciate that any other types of network traffic mirroring may have been configured or established via any of the network devices 110a-110n and/or traverse any network communication links 107, 108 of the embodiment of the network environment 100.

As illustrated in FIG. 1B, the mirroring techniques of the present invention may be in conjunction with an inter-network link 108. For example, the inter-network link 108 may traverse a public network, such as the Internet, and the remaining links 107 may be within a secure corporate network infrastructure. The mirroring communications 130a over link 108 may provide security of data for the mirrored network traffic, for example, by using an encapsulation technique. Network device 110c, for example, or mirror source 120b, could encapsulate data to mirrored network traffic of users 106a and 106b prior to communicating on the link 108. Likewise, network device 110d may provide encapsulation of mirrored network traffic 130b prior communicated to network device 110n connected to the analyzer 105n. One ordinarily skilled in the art will recognize and appreciate that the data encapsulation techniques of the present invention may be applied or used by any network device 110a, 110b or analyzer 105a-105b during all or any portion of the mirroring communications between a mirror source 120a-120n and a mirror destination 122a-122n.

In one aspect, the present invention is directed towards one or more techniques for dynamically mirroring network traffic. One embodiment of an exemplary method can be seen in the flow chart 200 of FIG. 2A. Here a method for dynamically mirroring network traffic comprises the steps of: monitoring an operational characteristic of a network for a criterion 210 and dynamically initiating traffic mirroring upon detection of a criterion in the monitored operational characteristic 220.

Operational characteristics of a network include, but are not limited to: network usage, network traffic, bandwidth congestion, configuration, access, and the like. Other possible operational characteristics will be apparent to one skilled in the art given the benefit of this disclosure.

The criterion may be an event or aspect of the operation characteristic. Specified policies or triggers based on aspects or events of the operation characteristics may cause the dynamic initiation of traffic mirroring.

Events may be changes in the trends of the network. For example, a sudden change in the bandwidth of traffic on a port may be an event that causes the traffic mirroring so that the traffic may be analyzed to determine possible causes for the increase in bandwidth.

Aspects of the operational characteristic may be content or format of the operation characteristic being monitored. For example, aspects may include the traffic association with specific port(s), the Network Layer protocol addresses contained in the traffic, content in the traffic's protocol layer fields, information contained in the traffic's Data Link Layer protocol header, the Identity of the User associated with the network traffic, Flow Label identifiers contained in an Multi-Protocol Label Switching protocol header or Flow Identifier in an IPv6 protocol packet, Differentiated Services Code Point in IPv4 protocol packet, and application specific data contained with the packet and not specific to the Layer 2, Layer 3 or Layer 4 protocol fields.

Another aspect of the operational characteristic may application specific content of the operation characteristic being monitored. For example, aspects may include traffic observed transporting hyper text transport protocol, session initiation protocol, real time protocol or other application specific data. Systems may additionally support the capability to construct application layer streams by extracting the application layer payloads on the packets being observed and combining the extracted data into an application specific form that can be inspected of operational characteristics that can cause the original traffic to be mirrored.

Other possible criteria will be apparent to one skilled in the art given the benefit of this disclosure.

Policies may be specified to initiate traffic mirroring upon detection of a criterion such as an aspect or event of the monitored operation characteristic. One specific example of a policy for dynamically establishing a mirror service portal is in the wire tapping of a Voice over IP (VoIP) communication. Law enforcement may only be authorized to copy the traffic to and from a specific VoIP phone. If a traditional mirror service portal was established, traffic other than that authorized would be mirrored violating the privacy rights of other users of a network. With the dynamic mirroring of the present invention, a policy rule specifies a mirror service portal is only established on the detection of a start of a VoIP call to or from a specific user, IP address, MAC address or other definable parameter. The mirror service portal may then be closed at the end of the VoIP call. In this manner, only the authorized traffic is mirrored.

Received triggers may be signals or indicators to dynamically establish a mirror service portal received eternally. For example, a mirror service portal could be dynamically established based on an external monitor such as an Intrusion Detection System (IDS) for the network detecting an intrusion. For example, a mirror service portal could be dynamically established based on an external monitor such as an intrusion detection system for the network detecting an intrusion or other event predetermined by the IDS operator. Upon the detection of an event by the Intrusion Detection System, that system, through a open or proprietary protocol, will locate the source system associated with the security event through various means. Upon discovery of the location of the source and destination systems that receive the sources traffic, the Intrusion Detection System will directly or indirectly through an intermediary system initiate data monitoring.

The monitoring of an operation characteristic for a criterion (step 210) may be implemented in software, hardware such as network device 110*a-n* and analyzers 105*a-n*, or a combination of both hardware and software. The monitoring of traffic may be performed at the network, device, or port level. The monitoring may also be implemented over several ports or devices. As indicated above, the network traffic may be monitored for characteristics or trends in the data of the network traffic.

In one aspect of the invention, dynamically initiating traffic monitoring comprises establishing a mirror service portal. As shown the flow chart 230 in FIG. 2B, establishing a mirror service portal (step 220) involves establishing a mirror source for mirroring traffic (step 240), establishing a mirror destination for receiving mirrored traffic(step 250), and communicating, by the mirror source, the mirrored traffic to the mirror destination (260).

Referring back to FIG. 1B, a mirror source 120*a*-120*b* may comprise a mirror sender device or a mirror sending mechanism and/or means of any network device 110*a*-110*n* and may be implemented as software, hardware, or any combination thereof. In one embodiment, the mirror source 120*a*-120*b* comprises or is associated with a port or a port of port module configurable to be a mirror port. A mirror port may be configured to copy all or a portion of network traffic, such as on a frame by per frame basis, transmitted and/or received on a given port of a network device 110*a*-110*n* to another port on the same device 110*a*-110*n*. The mirror source 120*a*-120*b* may comprise or be considered a function of a portion of the network device 110*a*-110*n* providing the mirror port or a replicating, duplicating, or otherwise network traffic copying service. In another aspect, the mirror source 120*a*-120*b* identifies the point or location of a network device 110*a*-110*n*, such as a port, queue, storage, or memory location, from which the mirroring of network traffic originates, initiates, or otherwise starts.

Again referring to FIG. 1B, a mirror destination 122*a*-122*b* may comprise a mirror receiver device or a mirror receiving mechanism and/or means of any network device 110*a*-110*n* and may be implemented as software, hardware, or any combination thereof. In one embodiment, the mirror destination 122*a*-122*b* comprises or is associated with a port or a port of port module of a network device 110*a*-110*n* or analyzer 105*a*-105*n* configurable to receive mirrored network traffic. The mirror destination 122*a*-122*b* may comprise or be considered a function of a portion of the network device 110*a*-110*n* or analyzer 105*a*-105*n* receiving mirrored network traffic as known to those ordinarily skilled in the art. In another aspect, the mirror destination 122*a*-122*b* identifies the point or location of a network device 110*n*-110*n* or analyzer 105*a*-105*n*, such as a port, from which the mirroring of network traffic terminates, completes, or otherwise ends. Moreover, the mirror destination 122*a*-122*b* may be on the same network device 110*a*-110*b* as the mirror source 120*a*-120*b*, or on a different network device 110*a*-110*n* in practicing the operations of the present described herein. For example, the mirror destination 122*a*-122*b* may be associated with a port of a network device 110*a*-110*n* also having a corresponding mirror source 120*a*-120*b* or another mirror source 120*a*-120*b*.

In other embodiments, only a portion of the network traffic is copied and provided to the mirror source 120*a*-120*b*. In some embodiments, the portion of each frame of network traffic to be copied may be configurable at the network device 110a-110n providing the mirror source 120a-120n. Additionally, the portion of the network traffic to be mirrored may be configured to be any granularity of the network traffic. For example, one or more fields of one or more protocol layers of the frame may be configured to be mirrored. In another example, only the data payload of one of the protocol layers of the frame may be mirrored. One ordinarily skilled in the art will recognize and appreciate that all or any portion of network traffic, such as all or any portion of a frame, a packet, or any other protocol data unit, at one or more network protocol layers may be mirrored in practicing the operations of the present invention described herein.

At step 260, the illustrative method 230 of the present invention provides mirroring communications between the mirror source 120a-120b and the mirror destination 122a-122b. The mirrored network traffic is communicated to the mirror destination 122a-122b. The mirrored network traffic may be communicated from the mirror source 120a-120b to the mirror destination 122a-122b. In one embodiment, the mirrored network traffic may traverse a local network system to a mirror destination 122a-122b. In another embodiment, the mirrored network traffic may traverse one or more network devices 110a-110n, network entry devices, network segments, transmissions mediums, and networks public or private, or the Internet.

In many communications networks, the infrastructure is built with devices that support various Data Link Protocols that support a maximum transfer unit, MTU. In IEEE 802.3 Ethernet network, a MTU of 1524 bytes is allowed. This means that any network attached device can only forward Frames with a size of 1524 bytes. The present invention supports the ability to discover MTU between the mirror source 120a-120b and mirror destination 122a-122b. The tunneling protocol chosen to provide the remote mirroring function may already incorporate an MTU path discovers capability. IPv4 in IPv4 tunneling supports this capability. For protocols that do not have the capability to detect the path's MTU, this method can utilize currently available MTU calculation methods such as the IETF's Path MTU Discovery protocol. Other alternative protocols that operate at different layers of the OSI model in the future may also be supported.

In some embodiments, when it is discovered that the mirrored traffic about to transmitted from the mirror source 120a-120b to the mirror destination 122a-122b exceeds the maximum network MTU, the mirrored data may be fragmented into "chunks" that will allow the mirror source 120a-120b to transmit the mirrored frames without violating the network path MTU. There are multiple traditional methods to fragment frames. Both standard and non-standard techniques may be supported. In one example, a mirror tunnel that contains data that will be fragmented would have an additional header that indicated that the frame contained a fragment as will as a fragment number. In the last tunnel frame carrying a fragmented frame, the mirror data will also have an additional fragment header that includes the indication that the mirror data is fragmented, the fragment number and end of fragment indication. The fragment headers can also include a fragment number of N fragments indication (ex. 1 of 5, 2 of 5, 3 of 5 etc.)

In many applications, it would be undesirable to simply mirror traffic into a tunnel and transmit it onto the network. If both the traffic under surveillance and the mirrored traffic were to be transmitted through the same ports on a network device 110a-110n, the link between network devices 110a-110n could easily become saturated, dropping both the original data under surveillance and the mirrored data. This is case that is highly likely when a mirror source 120a-120b is located on a different network from the mirror destination 122a-122b where the two networks are connected via a low speed WAN network. The present invention protects against network path bandwidth saturation by providing an adjustable buffer mechanism. Buffers can be thought of as temporary storage for the mirrored data. A buffer can be implemented with dynamic ram or a persistent storage media such as a magnetic hard drive. In one implementation, a network operator may specify the bandwidth that can be consumed by mirror tunnel as it transports the mirrored frames to the mirror destination 122a-122b. The device where the mirror source 120a-120b is located may also dynamically adapt the buffering used to shape the mirror tunnel traffic by monitoring the transmission path to calculate available bandwidth for transmission.

Likewise, in some instances the network traffic to be mirrored may be smaller than the maximum MTU of the network. In such cases it may be desirable to concatenate the network traffic to be mirrored to that it is mirrored at the maximum MTU of the network. For, example, the smaller sized data may be buffered until it the accumulated traffic reached the maximum MTU at which point the data is then mirrored.

In some applications, it may be desirable to mirror data to multiple points of analysis. For example, it is very common to utilize multiple IDS devices to monitor traffic for intruders and anomalies. In such implementations multicast addressing may be used to replicate traffic to more than one location. The mirror tunnel can be multicasted by using a Data Link Layer Multicast (MAC layer Multicast Destination only) or a Network Layer Multicast (MAC layer and Network layer Multicast addressing). This provides the most efficient method to support remote port mirroring to multiple locations.

In certain embodiments, the above described techniques can be further augmented by the addition of a session establishment method between the mirror source 120a-120b and mirror destination 122a-122b. A session establishment protocol may provide the ability for the mirror source 120a-120b and mirror destination 122a-122b to negotiate the tunnel protocol used during a mirror session, the amount of bandwidth used during the session, and he mirror source's 120a-120b authorization to establish a protocol to the mirror destination 122a-122b. This prevents un-authorized network surveillance.

The mirror source 120a-120b and mirror destination 122a-122b may also provide session quality verification. What is meant by session quality verification is that the mirror destination 122a-122b can report to the mirror source 120a-120b whether all of the mirrored frames it is expecting to receive actually reach the mirror destination 122a-122b. To accomplish this, the mirror source 120a-120b send frames containing information that relates to how many packets have been transmitted across the network. The mirror destination 122a-122b reads these protocol frames and verifies that it has received all of the expected data. In another implementation, the mirror source 120a-120b can establish a path verification session that tests MTU and Bandwidth between a mirror source 120a-120b and mirror destination 122a-122b. During the test, the mirror destination 122a-122b provides feedback to the initiating mirror source 120a-120b about the validity of the path. The mirror destination 122a-122b responds to the mirror source 120a-120b with a report on the quality of the path between the mirror source 120a-120b and mirror destination 122a-122b. If a path is not suitable the mirror source 120a-120b can choose to not establish a session between the two points.

An enhancement to the above described techniques allows for a network devices 120a-120n that are capable of acting as mirror destination 122a-122b that advertise to other devices 120a-120n in the network the capabilities and designations of the mirror destination 122a-122b they host. Having an advertisement protocol would simplify the configuration of mirror service portals. The advertisement protocol transmits to the network a list of mirror destination 122a-122b points it hosts as well as the parameters for each mirror destination 122a-122b. Examples of configuration parameters can include, but are not limited to: the name of mirror destination, tunnel protocols accepted by the mirror destination, the type of analysis device(s) or security auditing device(s) that will receive the mirrored data from the mirror destination, whether an authorization key is needed before an mirror destination will accept mirrored data from a mirror source, the current amount of bandwidth a mirror destination is currently capable of receiving, the maximum amount of bandwidth a mirror destination is currently capable of receiving, the current number of sessions that the mirror destination is receiving, and the maximum number of sessions that the mirror destination is capable of receiving.

The advertisement protocol can be transmitted over a Layer 2 protocol or Layer 3 protocol. Advertisements may also be made via Multicast or Broadcast methods. In certain embodiments there may be a central server that all mirror destinations 122a-122b announce their capabilities to and where mirror sources 120a-120b can query for available mirror destinations 122a-122b.

In certain embodiments, based on the parameters of the network, establishing a mirror service portal (step 230) may involve making policy changes to the network based on requirements for the mirror service portal. For example, if there are bandwidth limits in the network that could cause data loss in mirrored traffic, policy changes may be issued to change the bandwidth requirements in the network to allow for lossless traffic mirroring. In another example, where the data rate of the network traffic to be mirrored may changed by issuing a policy change for the network, effectively slowing down the transfer, allowing for accurate mirroring.

In some embodiments, communicating the mirrored traffic (step 260) is performed using encapsulation. Any type and/or form of protocol and any means and/or mechanisms for encapsulation may be used. In some embodiments, the encrypted mirrored network traffic may be encapsulated using a tunneling protocol, such as a secure tunneling protocol. For example, the tunneling protocol used by the present invention may include any version and/or implementation of any of the following tunneling protocols: a Point-To-Point Tunneling protocol (PPTP), Point-To-Point Protocol over Ethernet (PPPoE), Point-To-Point Protocol over ATM (PPPoA), a Layer 2 Tunneling Protocol (L2TP), a Generic Routing Encapsulation (GRE), Internet Protocol Security (IPsec), IP in IP Tunneling, and Multi-Protocol Label Switching (MPLS). One ordinarily skilled in the art will recognize and appreciate that any bridgeable or routable protocol may be used in practicing the operations of the present invention described herein.

Figure 3:
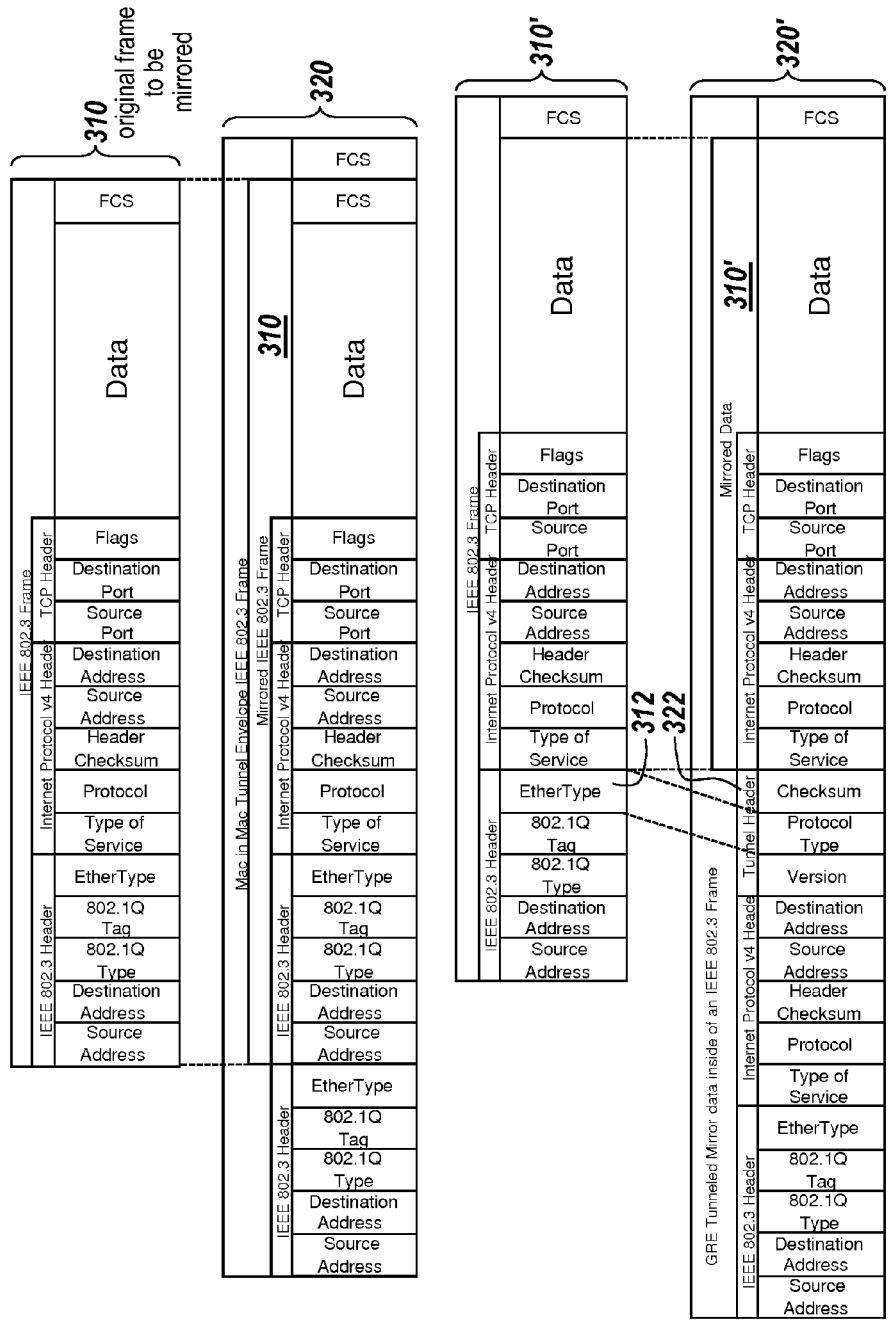
FIG. 3 depicts illustrative frames of mirrored network traffic for practicing an embodiment of the present invention.

In the example of FIG. 3, an original frame 310' of network traffic is encapsulated with a GRE tunneling protocol to form a modified frame 320' for mirroring. As depicted in the modified frame 320, one or more additional headers and/or fields related to the encapsulation or tunneling protocol may be appended to the original frame 310'. In one embodiment, the mirrored data 310' becomes the data payload for the modified frame 320'.

Additionally, the EtherType field 312 of the IEEE 802.3 header of the original frame 310' may be used to provide a portion of a tunnel header 322 of the modified frame 320'. For example, the EtherType may indicate the type of protocol of the original frame 310'. The tunnel header 322 of the modified frame 320' may have a field used to indicate the type of protocol used by the data payload of the encapsulated mirrored frame 310'.

In other embodiments the network traffic is tunneled to the mirror destination 122a-113b via a higher level protocol, such as HyperText Transfer Protocol Secure (HTTPS) or the Secure Socket Layer (SSL) protocol. For example, the mirrored network traffic 210, 210' may be encrypted and encapsulated via a secure web session using SSL and/or HTTP between the mirror source 120a-120b and the mirror destination 122a-122b.

In one embodiment, a Medium Access Control (MAC) Layer 2 tunneling may be used. A MAC-in-MAC tunneling techniques encapsulates a MAC frame with another MAC header, or a second MAC header. Referring to FIG. 3, an illustrative example of a frame of network traffic processed in accordance with a technique of the present invention is depicted. In the first example of FIG. 3, an original frame 310 of network traffic is encapsulated in a MAC-in-MAC tunneling protocol. As depicted in FIG. 3, a second IEEE 802.3 header is appended to the original frame 310 to form the modified frame 320 having data privacy. In some embodiments, all or a portion of the MAC frame encapsulated with a second MAC header may be encrypted. For example, the data portion of the encapsulated frame 320 may be encrypted.

Additionally, the encapsulation data technique of mirrored network traffic may be used with virtual leased line technologies and/or the Multiple Protocol Label Switching Standards, such as the Pseudo Wire Emulation Version 3 standard (PWE3). Furthermore, any type and/or form of custom or proprietary encapsulation protocol, or any type and/or form of custom or proprietary encapsulating protocol may used. One ordinarily skilled in the art will recognize and appreciate the various types and/or forms of encapsulating or tunneling protocols that may be used for providing at least a portion of mirrored network traffic during communications between the mirror source and the mirror destination.

The mirror destination 122a-122b receives the encapsulated mirrored network traffic wherein it is de-encapsulated or un-tunneled. In some embodiments, the mirror destination 122a-122b comprises any type and/or form of means and/or mechanism to de-encapsulate the encapsulated mirrored network traffic. In another embodiment, the mirror destination 122a-122n may have access to and be in communication with or interfaced to another device, mechanism, or system to provide for the de-encapsulation of the mirrored network traffic. Via de-encapsulation of the frames 320, 320', the mirror destination 122a-122b provides a copy of the original frame 310 or any portion thereof. Although the proceeding examples are discussed in reference to frames, the techniques of the present invention are not limited to the use of frames in the mirroring of network traffic.

In some embodiments of the present invention, network devices 110a-110n may support the ability to mirror network traffic remotely over a network by utilizing the IEEE 802.1Q VLAN tag/field of the frame in a virtual LAN environment (VLAN). VLAN environments are based on logical connectivity instead of physical connections, and as known to those ordinarily skilled in the art, may include any type of VLAN, such as a port-based VLAN, MAC-based VLAN, a protocol-based VLAN, or an ATM VLAN. In a VLAN environment, remotely mirrored network traffic may have a specific IEEE 802.1 Q VLAN tag the network devices 110a-110n *on the network* have been configured to direct the mirrored network traffic to specified portions. Utilizing the VLAN tag, the frame relay logic of the network device 110a-110n typically used for forwarding frames is bypassed. Network traffic mirrored in a VLAN environment may traverse or pass through many network devices 110a-110n before reaching the mirror destination 122a-122b.

Figure 2A:
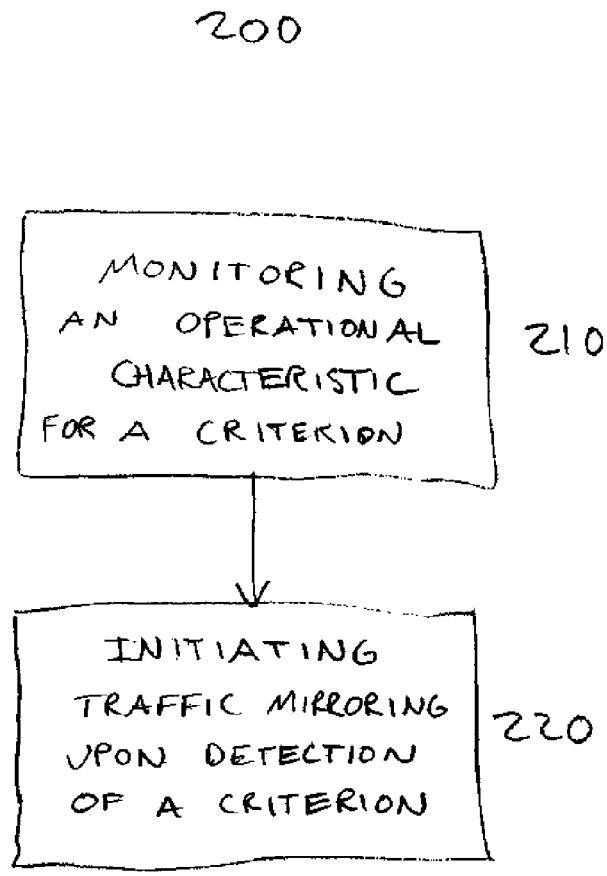
FIG. 2A is a flow diagram depicting an illustrative method for practicing an embodiment of the present invention.
Figure 2B:
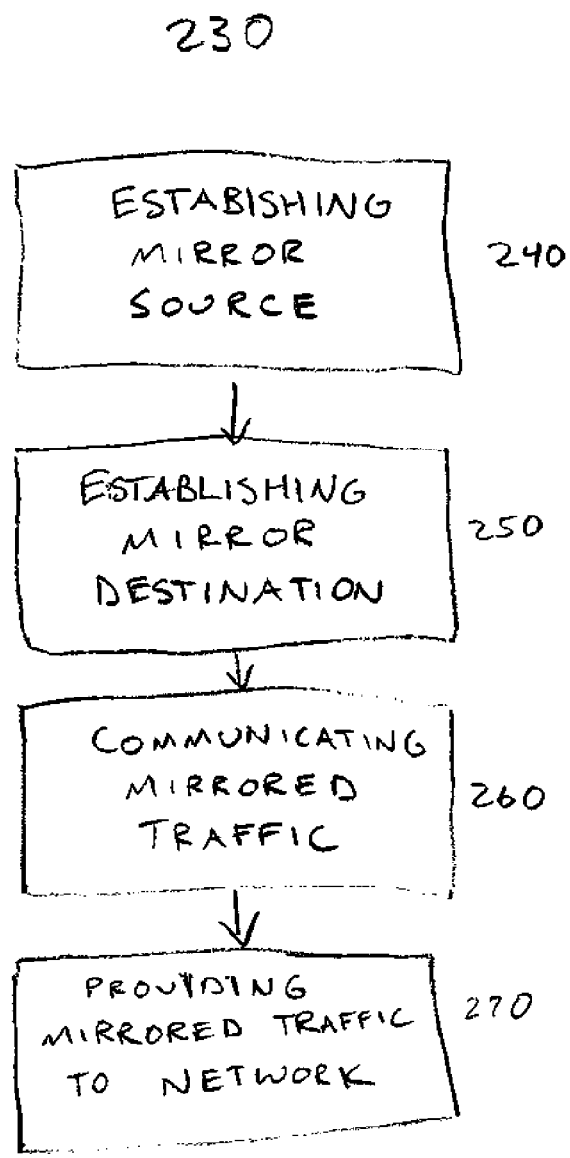
FIG. 2B is a flow diagram depicting an illustrative method for practicing an embodiment of establishing a mirror service portal.

Although the dynamic mirroring techniques of the present invention are discussed in conjunction with the illustrative network environment 200 of FIG. 2A having a mirror source 120a-120n communication to a mirror destination 122a-122b over a network, the operations and data privacy techniques of the present may be practiced in a single network device having both the mirror source 120a-120b and the mirror destination 122a-122b as one ordinarily skilled in the art will recognize and appreciate. For example, a network manager may desire to a configure a network device 110a-110n to maintain data privacy for local port mirrors when a device operator or technician is utilizing local port mirrors to trouble shoot a problem.

At step 270 of the illustrative method 250, the mirror destination 122a-122b provides the mirrored network traffic 211 for review, analysis, storage or any other desired purpose. For example, the mirrored network traffic may be provided to an analyzer 105a connected to the port or mirror destination 122a of the network device 110c. In another example, the mirrored network traffic may be provided to a wiretapping device or for wiretapping purposes associated with VoIP communications.

In some embodiments, in addition to the traffic that has been mirrored, additional data related to the mirrored traffic may be provided. For example, history of traffic sharing the same characteristics or classifications as the mirrored data, additional information about any of the characteristics of classification of the data (source, destination, etc.).

Figure 4A:
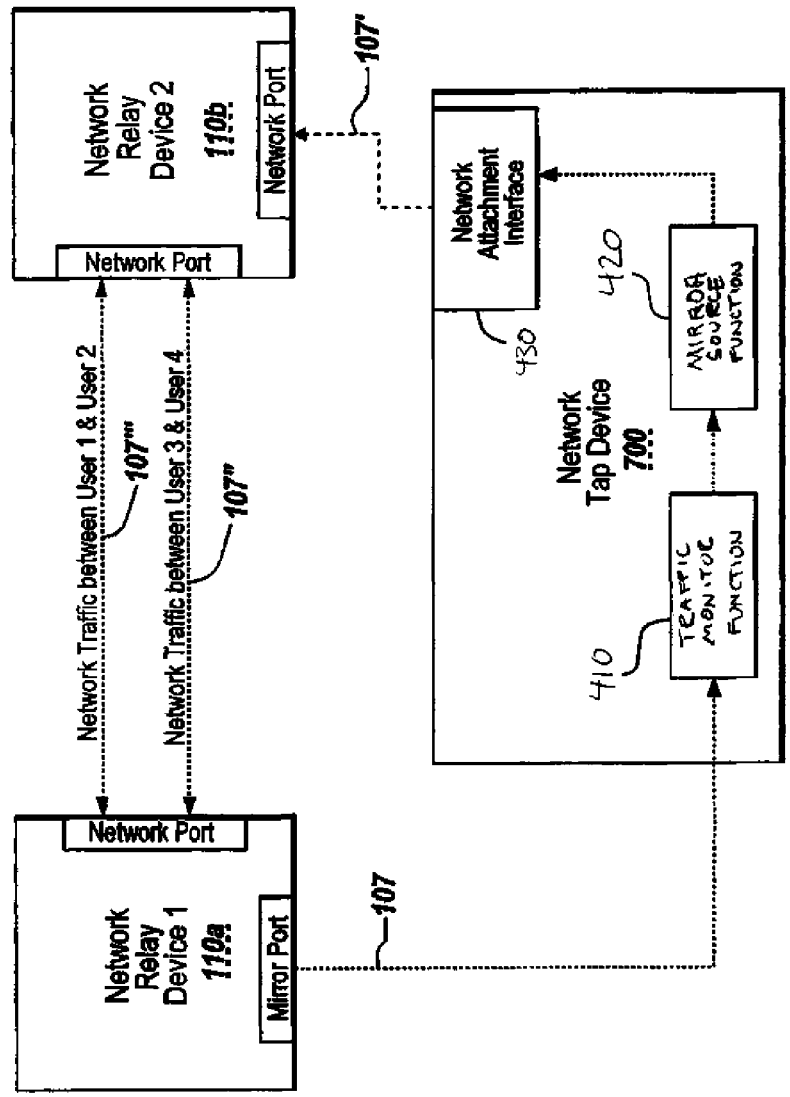
FIG. 4A is a block diagram depicting an illustrative network tap device of the present invention in an illustrative network environment.

In one aspect, the present invention is directed towards applying one of the dynamic mirroring techniques in an external device or apparatus. FIG. 4A depicts an external device, such as a network tap device 400, used for providing a dynamic mirroring. In brief overview, the network tap device 400 comprises a traffic monitor function 410 and a mirror source function 420. In this embodiment, the network tap device further comprises a network attachment interface 430. The traffic monitor function 410 may be interfaced with and in communication with the mirror source function 420 and the mirror source function 420 may be interfaced with and in communication with the network attachment interface 430 by any suitable interface and communications means and/or mechanism. In some embodiments, the mirror source function 420 may be included as part of the traffic mirror function 410, or vice-versa.

The traffic monitor function 410 monitors traffic on the network such as at a port of a network device 110a-110n or any other device, such as an analyzer 105a-105n or a tap device, such as a physical media tap device. In some embodiments, the traffic monitor function 410 may include or be a part of one or more ports or port modules of the network tap device 400.

The mirror source function 420 provides the data of the traffic to be mirrored from the network to a mirror destination upon a criterion being met. The mirror source 420 may also handle any protocols necessary to dynamically establish a mirror service portal such as determination of mirror destination as setting up a mirror tunnel.

Although generally referred to as a function, the traffic monitor function 410 and the mirror source function 420 may comprise any means and/or mechanism for providing the mirror source functionality and the data privacy functionality. The traffic monitor function 410 and the mirror source function 420 may be implemented in software, hardware, or any combination thereof.

The network attachment interface 430 provides a point of interconnection and communication interface between the network tap device 400 and a network or another device, such as connecting to a port of a network device 110a-110n. In some embodiments, the network attachment interface 430 comprises one or more ports or ports modules as known by those ordinarily skilled in the art. Additionally, the network attachment interface 430 may be designed and configured to interface to a Local Area Network (LAN), a Metropolitan Area Network (MAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. Connections via the network attachment interface 430 can be established using a variety of communication protocols (e.g.,.TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

In operation, the network tap device 400 may be connected to a mirror port of a network device 110a to receive frames of network traffic mirrored from the mirror port. The mirrored network traffic may comprise network traffic between one or more users, such as between a first user and a second user or between a third user and a fourth user that may be communicated between network device 110a and network device 110b. The mirror traffic function 410 monitors the network traffic. Upon a criterion being met, the mirror source function 420 provides the frames to the network attachment interface 430 for communicating to a mirror destination 122a-122b. In some embodiments, the mirror source function 420 may provide the modified mirror frames to the mirror source410 for communicating out to the connected mirror port of network device 110a.

In some embodiments, the network tap device 400 may be connected to a network that may not include any network device 110a-110n designed or configured to perform the dynamic mirroring of the present invention. As such, the network tap device 400 may be used as an external and network connectable device to provide dynamic mirroring.

The network tap device 400 may be used in applications where network operators, network security personnel, or law enforcement entities desire to be able to put under surveillance network traffic for trouble shooting, security auditing or evidence acquisition purposes without exposing the monitored traffic to any other entity with access to the network. In some embodiments, law enforcement entities and personnel may gain access to a corporate or enterprise network or a service provider network and insert a network tap device 400 to capture network traffic for surveillance and direct suspect traffic to another location and/or network, such as an office and network of the law enforcement entity. The network tap device 400 of the present invention may be utilized to ensure that only law enforcement personnel would have access to the mirrored traffic.

Figure 4B:
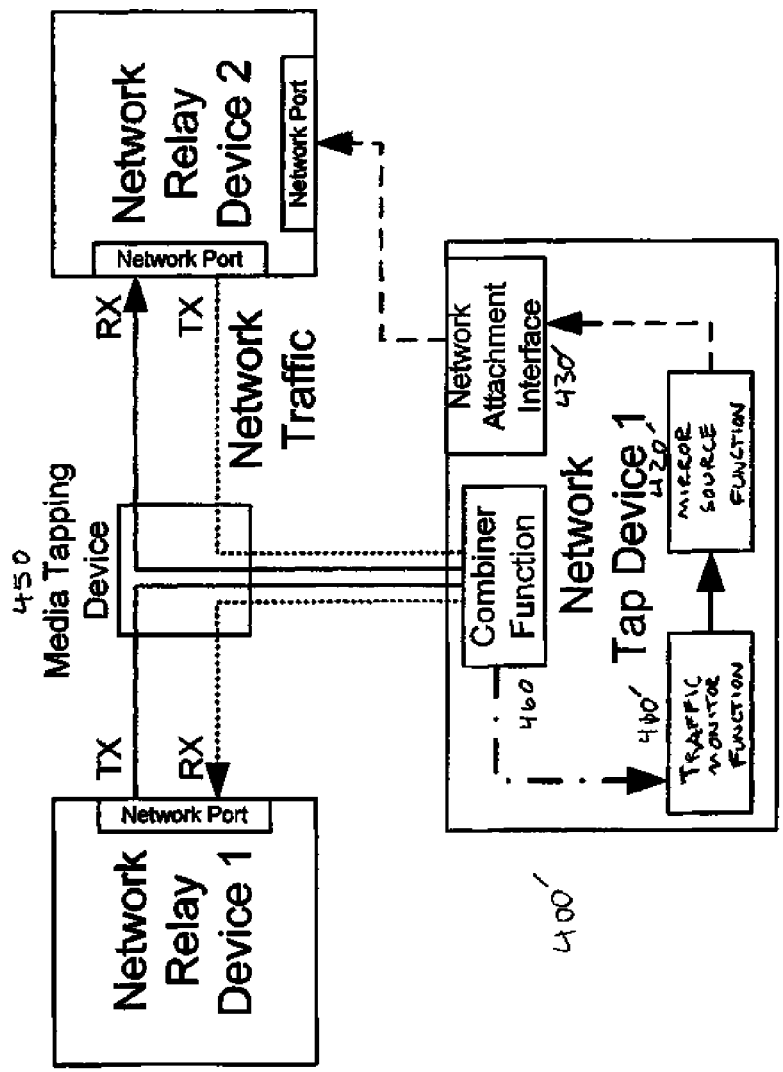
FIG. 4B is a block diagram depicting another embodiment of an illustrative network tap device of the present invention in an illustrative network environment.
Figure 4C:
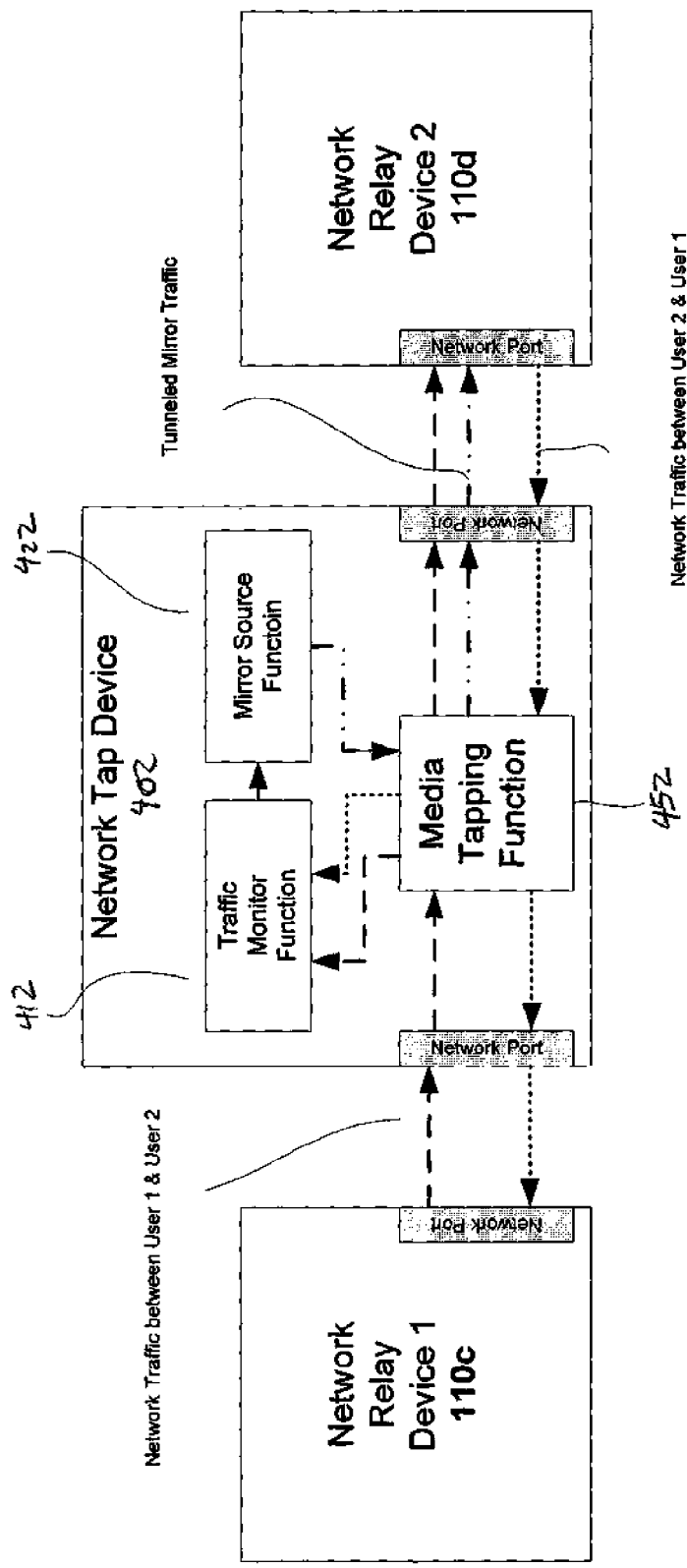
FIG. 4C is a block diagram depicting another embodiment of an illustrative network tap device of the present invention in an illustrative network environment.

FIG. 4B depicts a simple block diagram of a network tap device 400' inserted between two network relay devices. A physical media tapping device 450 is inserted between the network relay devices for the purpose of allowing the network tap device 400' to replicate the traffic passing between the two network relay devices. The media tapping device 450 can be electrically passive as in the case of an optical star coupler or active as in a shimoti tap. In this embodiment there is a combiner function 460 within the network tap device 400' aggregates both data stream paths on a relay device interconnection media that operates in a full-duplex manner. The network tap device 400' directs the traffic it receives at its combiner function and passes it to a mirror monitor function 410'. The mirror source 420' as described above is the ingress point for a mirror tunnel. The mirror source function 420' directs the network traffic to a network attachment interface 430' (example: IEEE 802.3 Ethernet entity) for transmission into the network destined to a mirror destination. Alternately, the network tap device 402 may include media tapping functionality, as seen in FIG. 4C, eliminating the need for an external tapping device 452. Here the media taping function 452, interfaced with the traffic monitor function 412 and mirror source function 422, performs the functionality of the media tapping device 450, combiner function 460 and the network attachment device 430'.

A network tap device 400, 400', 402 may be remotely configurable via various configuration protocols, including SNMP, Telnet, Console Access, and HTTP. A network tap device 400, 400', 402 may be powered through IEEE 802.3AF MDI Power interfaces.

Figure 5:
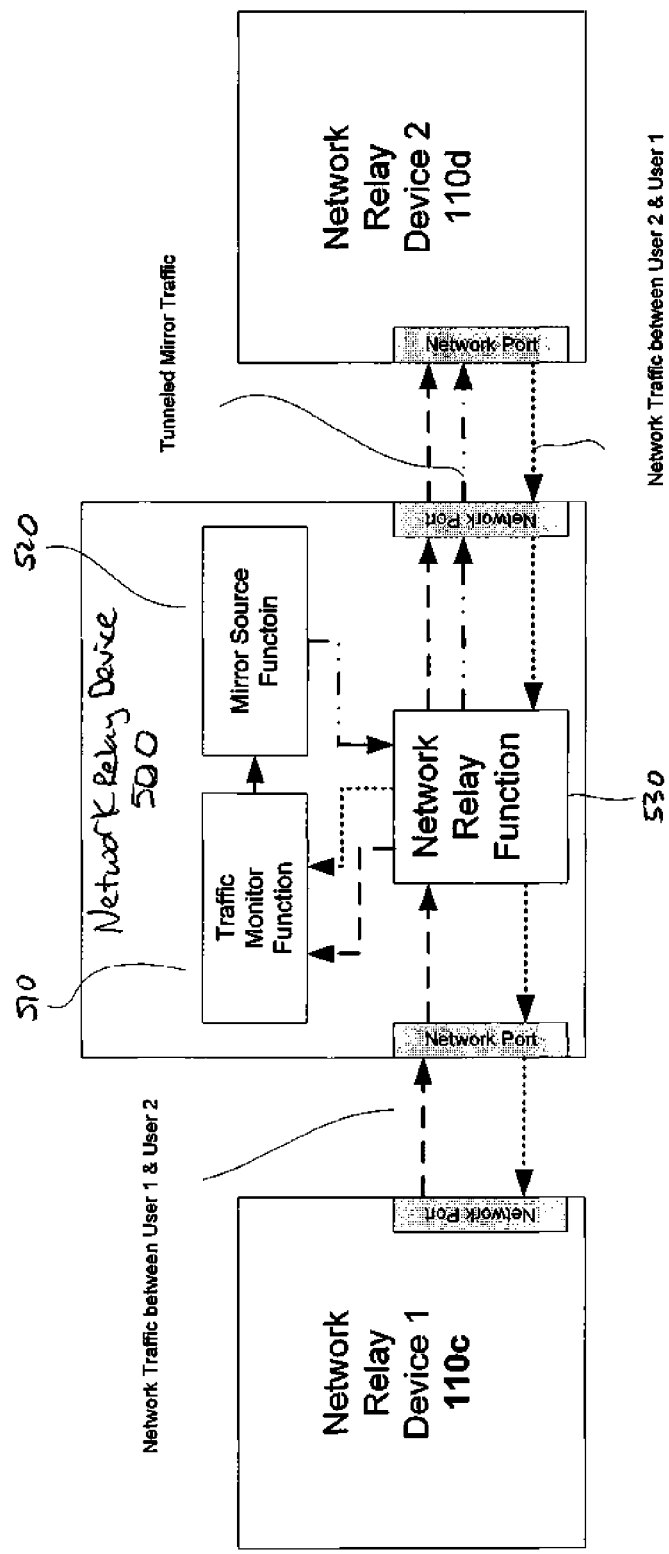
FIG. 5 is a block diagram depicting another embodiment wherein network tap device functionality is implemented in a network relay device in an illustrative network environment.

The tapping device functionality may also be incorporated in a network relay device 500, as seen in FIG. 5. Here, a network relay function 550 performs typical network relay device functionality but also provides the traffic monitor function 510 with network data for monitoring as well as providing a network interface for the mirror source function 520.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for dynamically mirroring network traffic in a packet forwarding device, the method comprising:
monitoring an operational characteristic of a network for a criterion; and
in response to detection of the criterion in the monitored operational characteristic of the network, dynamically initiating traffic mirroring of one or more packets in one or more flows of network traffic received by a packet forwarding device en-route to a destination device by,
establishing a mirror source for mirroring traffic,
identifying available mirror destinations for the mirrored traffic, and
selecting at least one of the available mirror destinations to receive the mirrored traffic,
wherein dynamic initiation of traffic mirroring occurs automatically in response to detection of the criterion.

2. The method of claim 1, wherein the criterion comprises a policy based criterion.

3. The method of claim 1, wherein the criterion comprises a trigger.

4. The method of claim 1, wherein the operational characteristic comprises network usage.

5. The method of claim 1, wherein the operational characteristic comprises network traffic.

6. The method of claim 1, wherein the criterion comprises an event in the monitored operational characteristic.

7. The method of claim 1, further comprising providing additional data related to the mirrored traffic to the selected mirror destination.

8. The method of claim 1, further comprising buffering the mirrored traffic.

9. The method of claim 1, wherein dynamically initiating traffic mirroring comprises making policy changes to the network based on requirements for traffic mirroring.

10. The method of claim 1, wherein dynamically initiating traffic mirroring further comprises establishing a mirror service portal.

11. The method of claim 10, wherein the minor service portal is established based on defined/established parameters.

12. The method of claim 11, wherein the defined/established parameters comprise the bandwidth limitations of the mirror service portal.

13. The method of claim 11, wherein the defined/established parameters comprise the desired quality of service for the mirror service portal.

14. The method of claim 11, wherein the defined/established parameters comprise the security requirements of the minor service portal.

15. The method of claim 11, wherein the defined/established parameters comprise the requirements of a destination for the minor service portal.

16. The method of claim 1, further comprising:
communicating, by the minor source, the mirrored traffic to the minor destination.

17. The method of claim 16, wherein the mirrored traffic is communicated using a tunneling protocol.

18. The method of claim 1, further comprising:
selecting the one or more packets of network traffic for mirroring to the at least one of the available mirror destinations as the mirrored traffic.

19. The method of claim 18, wherein only a portion of data in the selected packets of network traffic is mirrored as mirrored traffic.

20. The method of claim 1, wherein dynamically initiating traffic mirroring of the one or more packets of network traffic received by the packet forwarding device comprises:
dynamically initiating traffic mirroring of the one or more packets of network traffic received by the packet forwarding device between the minor source and the at least one of the available mirror destination devices of the network.

21. The method of claim 20, wherein the at least one of the available mirror destinations is distinct from a source device of the network traffic received by the packet forwarding device, a destination device of the network traffic received by the packet forwarding device, and the packet forwarding device.

22. The method of claim 1, wherein the packet forwarding device is one of a switch and a router.

23. The method of claim 1, wherein the minor source is established for mirroring traffic received by the packet forwarding device.

24. A non-transitory computer readable storage medium storing computer executable instructions for performing a method in a packet forwarding device, the method comprising:
monitoring an operational characteristic of a network for a criterion; and in response to detection of the criterion in the monitored operational characteristic, dynamically initiating traffic mirroring of one or more packets in one or more flows of network traffic from a packet forwarding device en-route to a destination device by,
   establishing a mirror source for mirroring traffic,
   identifying available mirror destinations for the mirrored traffic, and
   selecting one of the identified mirror destinations to receive mirrored traffic,
wherein dynamic initiation of traffic mirroring occurs automatically in response to detection of the criterion.

25. A network for dynamically mirroring network traffic from a packet forwarding device, the network comprising:
   a mirror traffic mechanism configured to monitor an operational characteristic of a network for a first criterion and, in response to detection of the first criterion, to initiate mirroring of one or more packets of network traffic from one or more flows of network traffic received by a packet forwarding device en-route to a destination device;
   a mirror source node for providing the mirrored network traffic; and
   a mirror destination node for receiving the mirrored network traffic from the minor source node;
   wherein a mirror service portal between the minor source node and the minor destination node is dynamically established upon the first criterion being detected by
      establishing the mirror source node for mirroring traffic,
      identifying available mirror destination nodes for the mirrored traffic, and
      selecting the mirror destination node to receive mirrored traffic based on the available mirror destination nodes identified.

26. The network of claim 25, wherein the minor service portal is established using a tunneling protocol.

27. The network of claim 26, wherein the tunneling protocol comprises a protocol selected from one of Mac-in-Mac tunneling; IEEE 802.1 backbone provider bridging;
   Internet protocol in Internet Protocol Tunneling; Generic Router Encapsulation Tunneling; Point to Point Protocol; Layer 2 tunneling protocol version 2; Layer 2 tunneling protocol version 3; IP Security tunnels; or GPRS tunneling protocol.

28. A packet forwarding network device for dynamically mirroring network traffic, the device comprising:
   a traffic monitor mechanism for monitoring network traffic of a network for a criterion; and
   a mirror source device for receiving one or more packets of network traffic from one or more flows of network traffic en-route to a destination device in response to the criterion having been met, for identifying available minor destinations for receiving one or more mirrored packets of network traffic from the packet forwarding device, for selecting at least one of the identified mirror destinations as a location to receive the one or more mirrored packets of network traffic, and for directing the one or more mirrored packets of network traffic to the identified minor destination.

29. The network device of claim 28, further comprising a network interface for communicating the one or more network traffic packets to a mirror destination.

30. The network device of claim 28, further comprising a media tapping function.

31. The network device of claim 28, wherein the monitored operational characteristic comprises mirrored network traffic.

* * * * *